(12) United States Patent
Chen et al.

(10) Patent No.: US 7,411,977 B1
(45) Date of Patent: Aug. 12, 2008

(54) EFFICIENT USAGE OF HARDWARE PROCESSING RESOURCES

(75) Inventors: John Chen, San Jose, CA (US); Brett Schein, San Jose, CA (US)

(73) Assignee: Arraycomm LLC., San Jose, CA (US)

( * ) Notice: Subject to any disclaimer, the term of this patent is extended or adjusted under 35 U.S.C. 154(b) by 1090 days.

(21) Appl. No.: 10/278,155

(22) Filed: Oct. 21, 2002

(51) Int. Cl.
*H04J 3/16* (2006.01)
*H04J 3/22* (2006.01)

(52) U.S. Cl. ..................................... 370/468
(58) Field of Classification Search ........................ None
See application file for complete search history.

(56) References Cited

U.S. PATENT DOCUMENTS

| | | | |
|---|---|---|---|
| 5,274,635 A * | 12/1993 | Rahman et al. | 370/352 |
| 5,987,021 A * | 11/1999 | Erickson et al. | 370/347 |
| 6,166,622 A * | 12/2000 | Hosur et al. | 340/318 |
| 6,996,060 B1 * | 2/2006 | Dahlby et al. | 370/230 |
| 6,996,083 B1 * | 2/2006 | Balachandran et al. | 370/337 |
| 7,016,375 B1 * | 3/2006 | Rosenberg et al. | 370/468 |
| 2004/0259597 A1 * | 12/2004 | Gothard et al. | 455/562.1 |

FOREIGN PATENT DOCUMENTS

EP  0872 979 A2 * 10/1998

* cited by examiner

*Primary Examiner*—Edan Orgad
*Assistant Examiner*—Blanche Wong
(74) *Attorney, Agent, or Firm*—Blakely, Sokoloff, Taylor & Zafman (57) ABSTRACT

A wireless communication device monitors a radio frequency (RF) resource for a signal from a remote terminal. The wireless communications device detects the absence of the signal in the monitored RF resource. If the signal is not present in the RF resource, the wireless communications device reallocates processing resources reserved to process the signal to process data from another remote terminal.

13 Claims, 7 Drawing Sheets

EFFICIENT USAGE OF HARDWARE PROCESSING RESOURCES

TECHNICAL FIELD

Embodiments of the invention relate to wireless communication systems. More particularly, specific embodiments of the invention relate to efficient usage of hardware processing resources in wireless communication systems.

BACKGROUND

Wireless communication systems such as cellular voice and data radio systems typically have several base stations in different locations available for use by mobile or fixed remote terminals. Remote terminals (e.g., telephones, personal digital assistants, and wireless web devices) allow one or more users to establish communications links with a base station over a radio frequency (RF) resource. The term remote terminal also includes a device or application attached to the remote terminal. A base station is a communications device that allows one or more remote terminals to access a larger communication system (e.g., a cellular telephone network, the Internet, etc.). A subscriber is a person or entity owning or using a remote terminal. A radio frequency (RF) resource may be an RF carrier; a timeslot, for example, in a time division multiple access system (TDMA); a frame; a code, for example, in a code division multiple access (CDMA) system; a frequency, for example, in a frequency division multiple access system (FDMA); or some combination thereof.

Conventional base stations employ paging schemes to periodically inform remote terminals that the base stations have information to transmit to the remote terminals. Users (through a remote terminal) periodically monitor an RF resource to determine whether a relevant page is being transmitted. Remote terminals are typically powered by batteries and those batteries are fractionally depleted each time a remote terminal monitors the RF resource. If the remote terminal is infrequently monitoring the RF resource, however, the user will likely wait longer before determining that the base station wants to establish a stream with the user.

Therefore, it is advantageous to strike a balance between depleting a battery by monitoring an RF resource and yet still monitoring the RF resource often enough to receive a page in a timely manner. Typically, a base station will periodically transmit a page burst for a particular user until the user (through a remote terminal) responds or until the base station determines that it is no longer appropriate to page the user. The length of time it takes to determine that the base station is transmitting a page burst is called paging latency.

Figure 1:
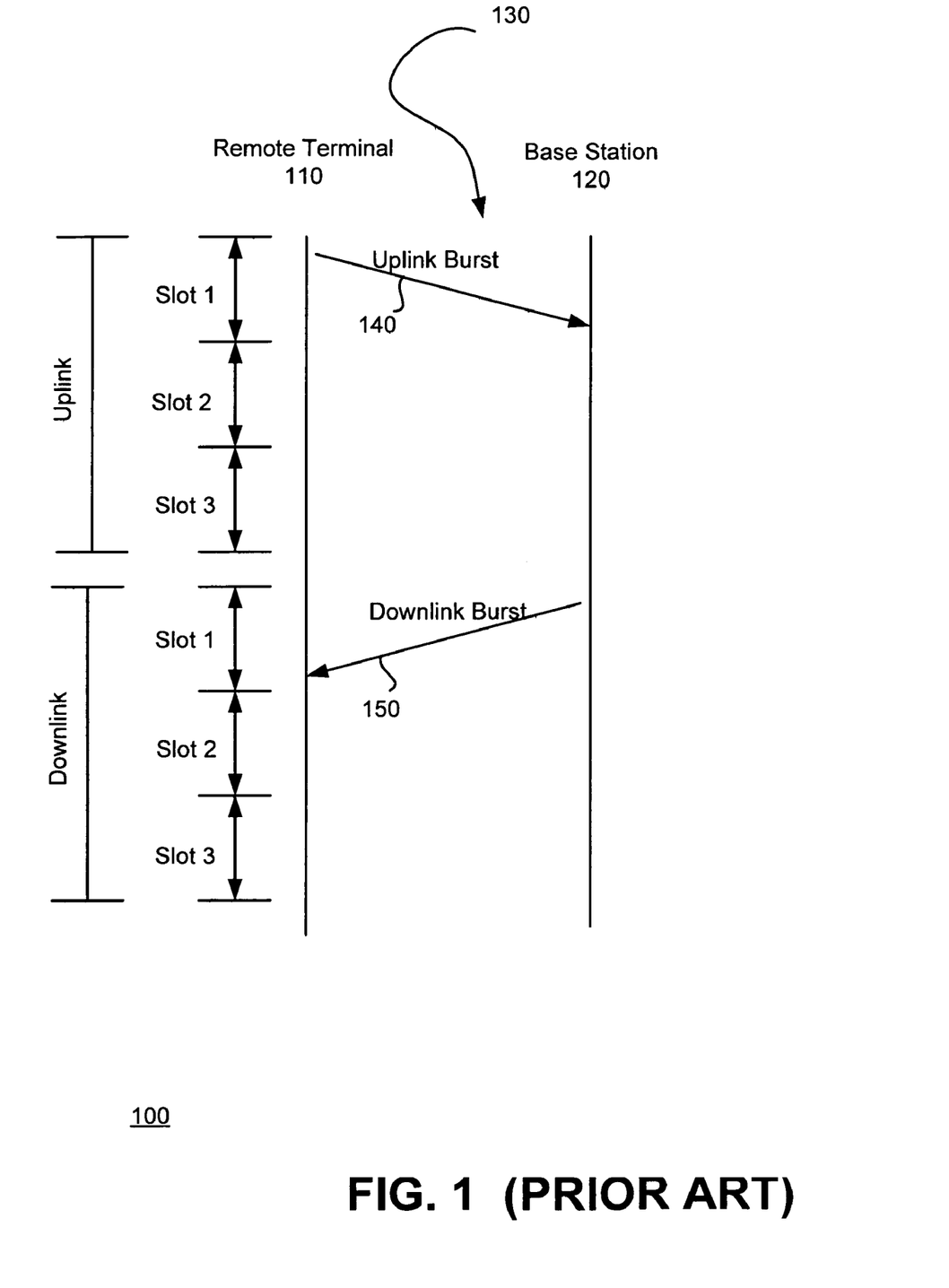
FIG. 1 is a signal diagram illustrating certain elements of conventional wireless communication system 100.

FIG. 1 is a signal diagram illustrating certain elements of conventional wireless communication system 100. Remote terminal 110 and base station 120 establish communication channel 130. Communication channel 130 consists of three uplink/downlink timeslot pairs, which together form a frame. Uplink/downlink timeslot pairs are typically allocated together to a particular user in conventional wireless communication system 100. Remote terminal 110 transmits uplink burst 140 during the first uplink timeslot.

Base station 120 receives uplink burst 140 and determines whether the uplink burst includes a desired signal. The desired signal may be a training sequence, a request for information, or another signal that base station 120 recognizes as an indicator that it is appropriate to transmit downlink burst 150. If uplink burst 140 does not include the desired signal or if uplink burst 140 is not transmitted, base station 120 does not typically transmit downlink burst 150. Since uplink burst 140 and downlink burst 150 are allocated as a pair, the processing resources required to transmit downlink burst 150 may be wasted if the desired signal is not detected in uplink burst 140. Processing resources may include machine cycles, clock cycles, arithmetic logic unit resources, control unit resources, memory resources, or some combination thereof.

SUMMARY

A method and apparatus for providing efficient usage of hardware processing resources is disclosed. In one embodiment of the invention, a wireless communication device (e.g., a base station) monitors a radio frequency (RF) resource for a signal from a remote terminal. The base station detects the absence of the signal in the monitored RF resource. If the signal is not present in the monitored RF resource, the base station reallocates processing resources reserved to process the signal to process data from another remote terminal (e.g., to process a random access burst or a page burst).

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 2:
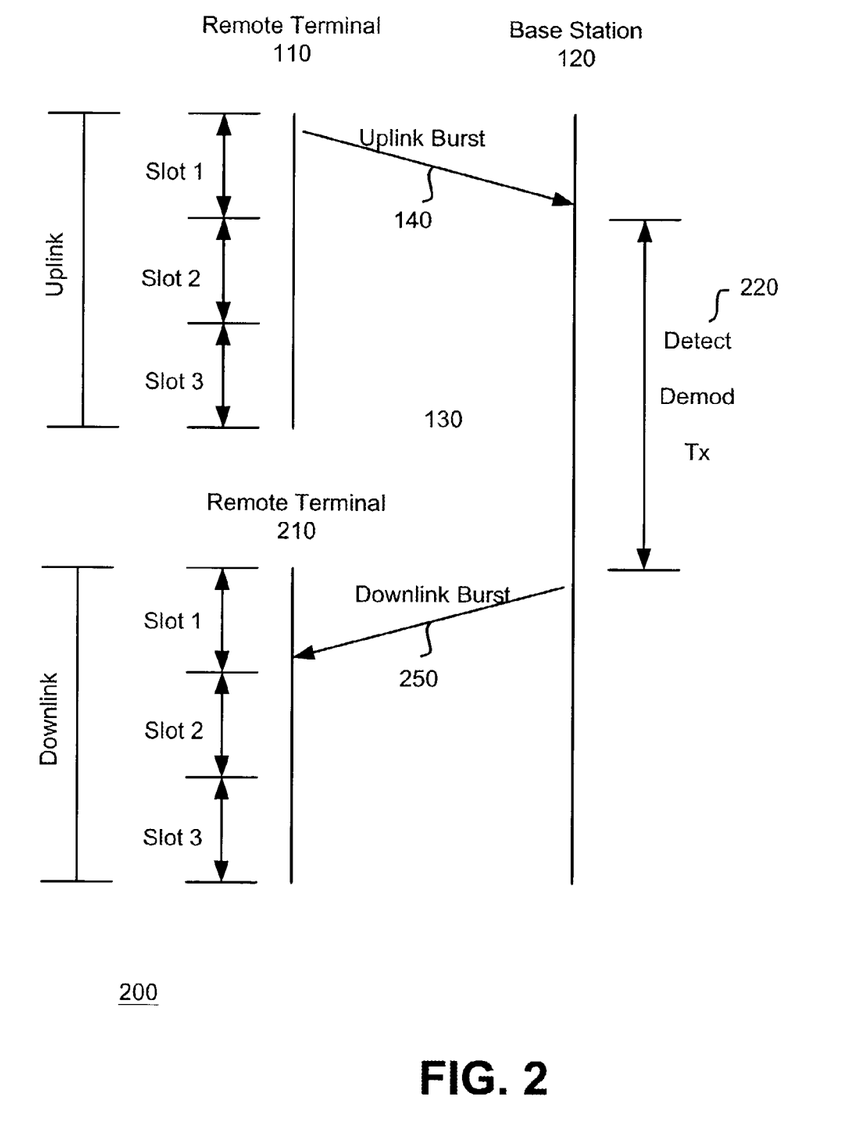
FIG. 2 is a signal diagram illustrating certain elements of wireless communication system 200, which provides efficient usage of hardware resources, according to an embodiment of the invention.

FIG. 2 is a signal diagram illustrating certain elements of wireless communication system 200, which provides efficient usage of hardware resources, according to an embodiment of the invention. Some elements of wireless communication system 200 are similar to elements of wireless communication system 100 and those elements are similarly numbered. Remote terminal 110 and base station 120 establish communication channel 130. Communication channel 130 consists of three uplink/downlink timeslot pairs. Each uplink/downlink timeslot pair is allocated to a particular user, according to an embodiment of the invention.

Remote terminal 110 transmits uplink burst 140. Base station 120 determines whether uplink burst 140 contains a desired signal at 220, according to an embodiment of the invention. If uplink burst 140 does not contain the desired signal or if uplink burst 140 is not transmitted, base station 120 reallocates downlink burst 250 to another user. In one embodiment of the invention, base station 120 transmits a downlink paging burst 250 to remote terminal 210. The details of efficient usage of hardware processing resources are further described below.

Base Station Structure

Figure 3:
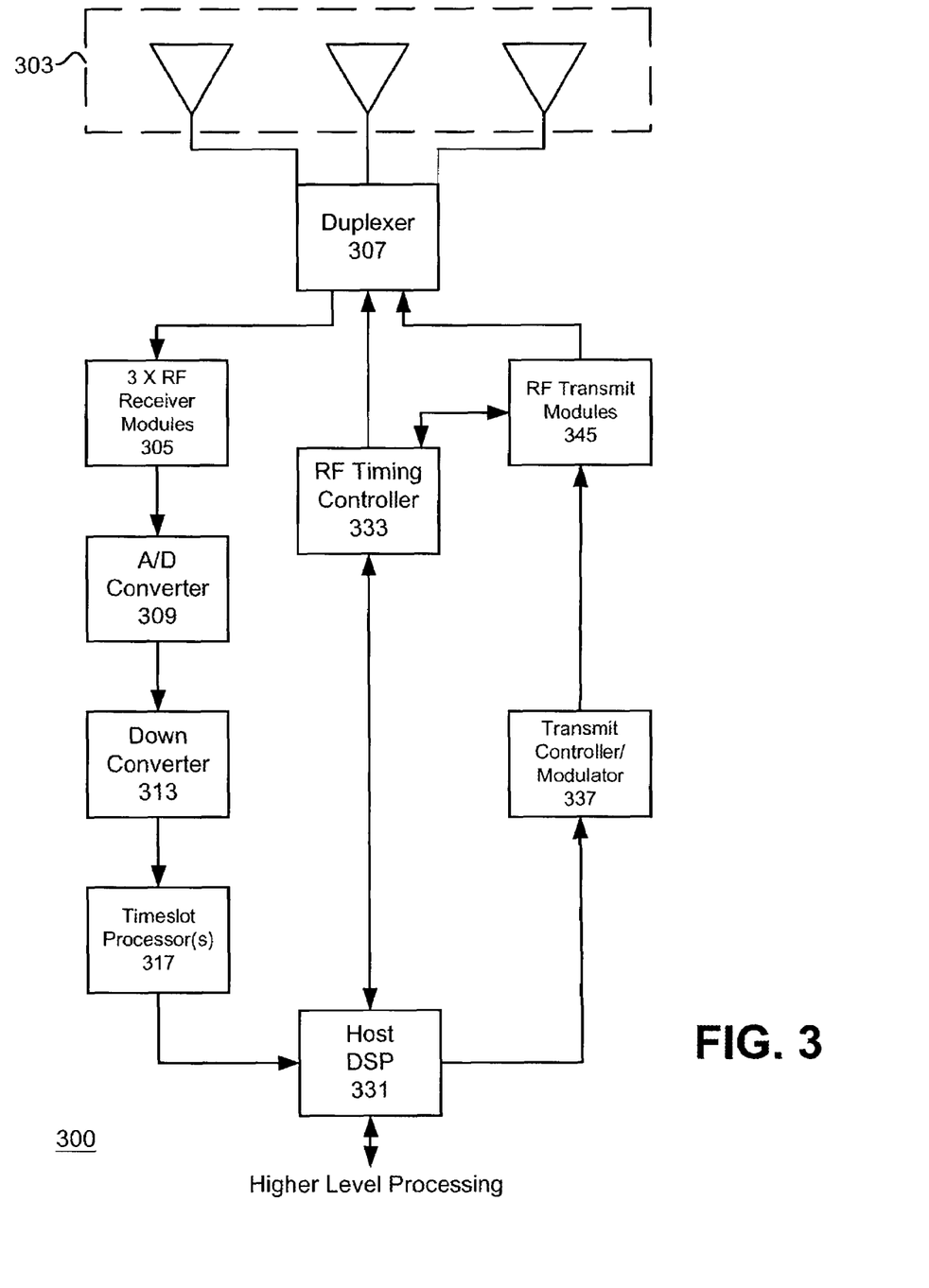
FIG. 3 is a simplified block diagram of base station 300 implemented according to an embodiment of the invention.

FIG. 3 is a simplified block diagram of base station 300 implemented according to an embodiment of the invention. Base station 300 includes a plurality of antennas 303, duplexer 307, RF receiver modules 305, analog to digital converter 309, down converter 313, timeslot processor(s) 317, host digital signal processor (DSP) 331, transmit controller/modulator 337, RF transmit modules 345, and RF/timing controller 333 connected through one or more system interconnects as shown. Base station 300 may be connected to a wide area network (WAN) through its host DSP. A plurality of antennas 303 is used (e.g., three antennas as shown) to enable base station 300 to support spatial diversity. Support of spatial diversity is well known in the art and will not be further described except as it pertains to the invention.

The outputs of the antennas are connected to duplexer switch 307. In the illustrated embodiment of the invention, duplexer switch 307 is a time switch. In alternate embodiments of the invention, (e.g., in a frequency division duplex system), duplexer switch 307 is a frequency switch. When base station 300 is receiving a signal, the antenna outputs are connected through switch 307 to receiver modules 305. Receiver modules 305 convert a carrier frequency to an intermediate frequency (IF). The IF signal is then digitized by analog to digital converter 309. Down converter 313 converts the digitized signal to baseband. In one embodiment of the invention, down-converter 313 produces three outputs (one for each antenna) corresponding to three downlink timeslots per time division duplex (TDD) frame. A person of ordinary skill in the art will recognize that the number of timeslots per frame may be different than three. Also, the invention can be adapted to suit a wide variety of RF and IF carrier frequencies and bands.

Each of the three down-converted outputs from the three antennas is fed to timeslot processor(s) 317 for further processing, including signal detection, according to an embodiment of the invention. Typically, timeslot processor(s) 317 are implemented with one or more digital signal processors. In alternate embodiments of the invention, however, timeslot processors may be implemented with a microprocessor, microcontroller, filed programmable gate array (FPGA), application specific integrated circuit (ASIC), central processing unit (CPU), or similar devices. In the illustrated embodiment of the invention, base station 300 employs a separate DSP for each timeslot. In alternate embodiments of the invention, a single DSP is used to process the down-converted outputs. Three Motorola DSP56303 DSPs, one per timeslot, may be used to implement timeslot processors 317. In one embodiment of the invention, timeslot processors 317 determine whether a desired signal is present in a received signal. In alternate embodiments of the invention, host DSP 331 determines whether the signal is present in the received signal. Processing resources are available if, for example, they have been reserved to process a signal and a base station determines that the signal is absent from an RF resource. Reallocated processing resources may be resources of one or more timeslot DSPs 317, resources of host DSP 331, or some combination thereof.

Timeslot processor(s) 317 provide demodulated burst data from the receive timeslots to host DSP 331. Host DSP 331 maintains state and timing information, receives uplink burst data from timeslot processor(s) 317, and programs timeslot processor(s) 217. Additionally, host DSP 331 decrypts, descrambles, checks error correcting code, deconstructs bursts of the uplink signals, and formats the uplink signals to be sent for higher level processing in other parts of the base station. With respect to the other parts of the base station, it formats service data and traffic data for further higher processing in the base station, receives downlink messages and traffic data from the other parts of the base station, processes the downlink bursts and provides the downlink bursts to transmit controller/modulator 337.

In one embodiment of the invention, host DSP 331 reallocates processing resources reserved to process a downlink timeslot from a scheduled user to process data form (or for) another remote terminal, when a desired signal is not detected in an uplink timeslot. In such an embodiment of the invention, host DSP 331 may reallocate processing resources to process a paging burst for an unscheduled user, a random access burst for an unscheduled user, or to process other data not related to the scheduled user for the uplink timeslot.

RF timing controller 333 interfaces with RF transmit modules 345. RF timing controller 333 produces a number of timing signals that are used by both RF timing modules 345 and a modem (not shown). Also, RF controller 333 reads and transmits power monitoring and control values, controls duplexer 307 and receives timing parameters and other settings from host DSP 331 for each burst.

Transmit controller/modulator 337, receives transmit data from host DSP 331. Transmit controller 337 uses this data to produce analog IF outputs which are sent to RF transmitter modules 345. Specifically, received data bits are converted into a complex modulated signal, up-converted to an IF frequency, 4-times over-sampled, multiplied by transmit weights obtained from host DSP 331, and converted via digital to analog converters to analog transmit waveforms. The analog waveforms are sent to transmit modules 345.

Transmit modules 345 up-convert the signals to the transmission frequency and amplify the signals. The amplified transmission signal outputs are sent to antennas 303 via duplexer 307.

Channel, Frame, and Message Structure

As will be further described below, in accordance with an embodiment of the invention, communication between base stations and remote terminals occurs in sets of sequential time intervals called frames. In the described embodiment of the invention, each frame is divided into a selected number of uplink/downlink timeslot pairs. For each uplink timeslot, there is an associated downlink timeslot. The description hereinafter will generally apply to one embodiment of the invention used in a time division multiple access (TDMA) system, but the invention is not limited to TDMA systems. For example, each frame may be divided into uplink/downlink frequency band pairs as may be used in an FDMA system.

Physical Channel Structure

Figure 4:
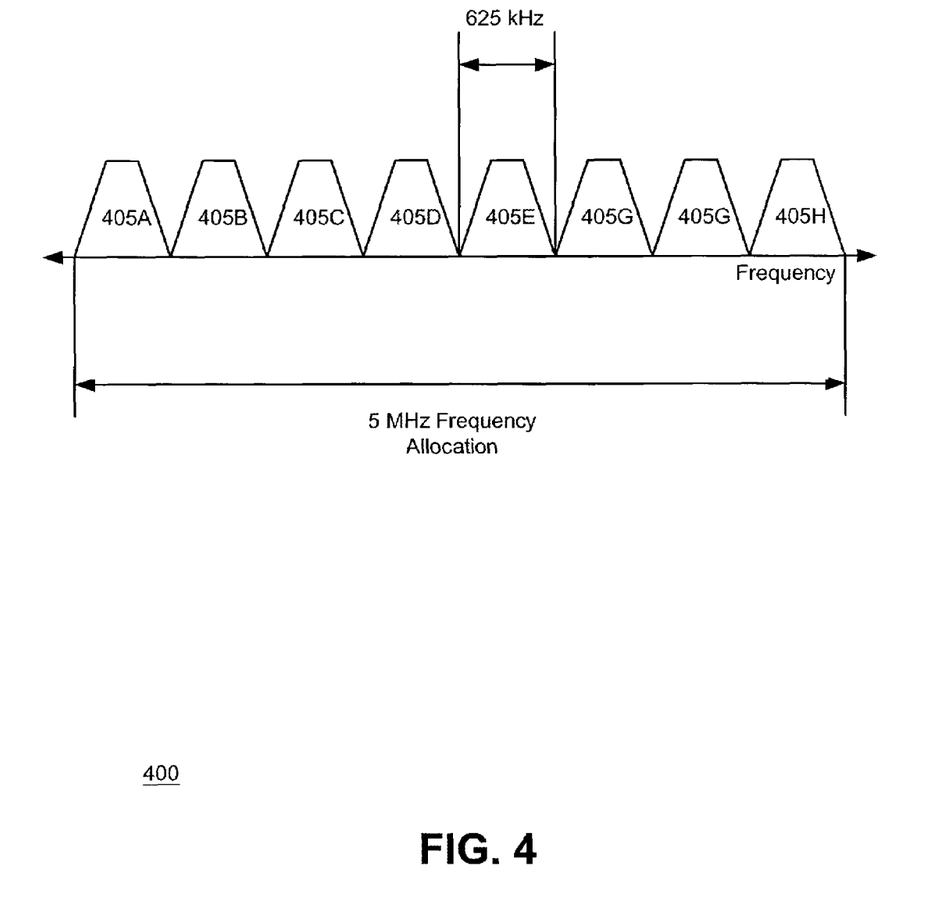
FIG. 4 is a frequency diagram illustrating spectral allocation for an embodiment of the invention employing TDMA.

FIG. 4 is a frequency diagram illustrating spectral allocation for an embodiment of the invention employing TDMA. Referring to FIG. 4, an allocation of 5 MHz is divided into eight RF channels 405A-405G. In the illustrated embodiment of the invention, RF channels 405A-405G are each allocated 625 kHz. In some embodiments of the invention, RF channels 405A-405G are allocated a bandwidth different than 625 kHz. In alternate embodiments of the invention, RF channels may vary in bandwidth from one another. In one embodiment of the invention, RF channels 405A-405G are further divided into 5 ms frames.

Figure 5:
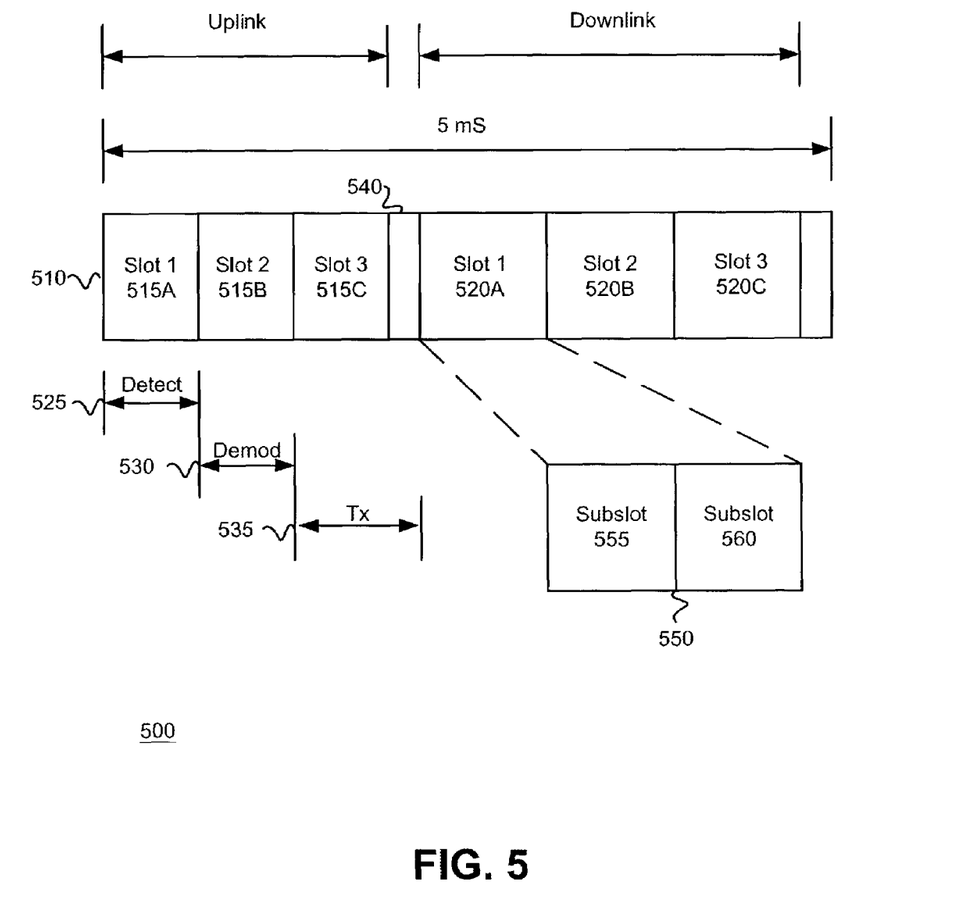
FIG. 5 is a block diagram of a 5 ms frame according to an embodiment of the invention.

FIG. 5 is a block diagram of 5 ms frame 510, according to an embodiment of the invention. Frame 510 is subdivided into a selected number of uplink data transfer periods (e.g., timeslots 515A-515C) and a selected number of downlink data transfer periods (e.g., timeslots 520A-520C). In an embodiment of the invention, uplink timeslots 515A-515C are 545 μs in duration and downlink timeslots 520A-520C are 1090 μs in duration. In an embodiment of the invention, the uplink timeslots are separated from the downlink timeslots by a 10 μs guardtime shown at 540. Different embodiments of the invention employ timeslots of different durations.

Burst Types and Logical Channels

A transmission on a slot is called a burst. In one embodiment of the invention, seven different burst types are used to transport control and data messages. In such an embodiment of the invention, frequency synchronization, timing synchronization, broadcast, page, and downlink traffic bursts are transmitted in downlink timeslots. Configuration requests, random access bursts, and uplink traffic bursts are transmitted in uplink timeslots, in an embodiment of the invention. Each burst is partitioned into ramp-up, training, payload, control, and ramp-down segments.

An embodiment of the invention employs a number of logical channels. Logical channels are conceptual communications pathways between a remote terminal and a base station that can be mapped to any of a number of physical channels. Table 1 provides the logical channels employed in an embodiment of the invention.

TABLE 1

| Channel | Direction | Spatial Processing | Function |
|---|---|---|---|
| Broadcast Channel (BCH) | Downlink | Diversity only | Synchronization, pathloss, and handover measurements, BS color code announcements |
| Paging Channel (PCH) | Downlink | Diversity only | Paging to initiate stream for downlink data |
| Configuration Channel (CCH) | Bidirectional | Yes | Exchange of basic BS and remote terminal parameters necessary to initiate registration |
| Random Access Channel (RACH) | Bidirectional | Yes | Registration, stream request and setup, power control and modulation selection |
| Traffic Channel (TCH) | Bidirectional | Yes | Exchange of acknowledged and unacknowledged mode data, including user data and control information for modulation selection, power control, exchange of security parameters, stream aggregation |

Over the lifetime of a session, a base station and a remote terminal proceed through a sequence of one or more of the channels listed in Table 1, according to an embodiment of the invention. For example, a remote terminal may transmit a stream request message on an uplink timeslot of a random access channel (RACH) to a base station. The base station may respond with an access assignment message on the corresponding downlink timeslot of the RACH. Once a stream is established, the remote terminal and the base station may exchange data and control information over the uplink and downlink timeslots of a traffic channel (TCH).

In an embodiment of the invention, TCH and RACH resources are allocated in uplink/downlink pairs from a physical channel perspective. Thus, if the base station is monitoring an uplink timeslot of a traffic channel for a burst from a remote terminal, the base station has typically already allocated resources to respond to the remote terminal, during a corresponding downlink timeslot. The remote terminal for which the base station allocates the corresponding downlink timeslot resources (e.g., RF resources and processing resources) is hereinafter referred to as the scheduled user.

Access Assignment Message

A remote terminal may transmit a random access message (e.g., RA-request-to-send) on the uplink side of a random access channel. A base station may use the downlink portion of the random access channel to grant random access requests and to assign resources to the requested data stream using an AA (Access Assignment) message.

The AA message may include a registration identifier or paging identifier associated with the remote terminal to which the AA burst is addressed. When the AA message is used to grant a stream (e.g., an AA-cts message), the AA message may include resource assignment information, such as a conventional channel ID, a logical channel ID, a spatial channel number, or some other form of resource assignment. The AA message may also contain other information, such as modulation and coding information, power adjustment commands, timing advance measurements, or other data and control messages.

The AA message can have different formats. One format is shown in Table 2 below.

TABLE 2

| Access Assignment Message | |
|---|---|
| Field | # of Bits |
| ID | 15 |
| AAType | 3 |
| modClassUp | 5 |
| modClassDown | 5 |
| frameDec | 3 |
| resource ibChan | 6 |
| pwrCtrl | 4 |
| timingAdjust | 5 |
| tOffset spChan | 3 |
| Total | 49 |

The meanings of the symbol sets are as follows:

ID: the id of the remote terminal, either the registration identifier (RID) or paging identifier (PID) that was transmitted in the RA-rts.

modClassUp: identifies the modulation and coding used for the uplink.

modClassDown: identifies the modulation and coding used for the downlink.

frameDec: defines fractional rate channels.

resource ibChan: indicates the uplink/downlink resource pair that is assigned to the stream.

pwrCtrl: a power adjustment for the remote terminal to apply to subsequent transmissions.

timingAdjust: a timing adjustment for the remote terminal to apply to subsequent transmissions.

tOffset: training sequence offset adjustment for the remote terminal to apply to subsequent transmissions.

AAType: indicates the type of Access Assignment message. Many different possible types are possible. Example AA messages are:

AA-cts: a message sent to grant the requested TCH data stream;

AA-reject: a message sent to deny the requested TCH data stream;

AA-ping-ack: a message sent to acknowledge receipt of an RA-ping and to let the user terminal know that the registration expiration timer has been reset;

AA-cts-short: a message sent to grant a requested short TCH data stream; and

AA-queued: a message sent to inform the remote terminal that the base station received a request for a TCH data stream and will page the remote terminal when there are resources available for the stream.

As will be more fully described below, a base station (e.g., base station 300 shown in FIG. 3) may use access assignment (AA) messages to inform a remote terminal that one or more RF resources have been allocated to the remote terminal. For example, the base station may allocate a traffic channel on a given RF resource to the remote terminal by sending the remote terminal a stream grant access assignment. In an embodiment of the invention, a base station uses the resource ibChan field to assign an RF resource to a remote terminal. Similarly, the base station may use an AA message to inform the remote terminal that the base station will page the remote terminal at a later time. In an embodiment of the invention, the AA-queued message is used to inform the remote terminal that the base station will page the remote terminal when resources are available to establish a traffic channel data stream between the base station and the remote terminal. In an embodiment of the invention, AA messages are transmitted in AA bursts on downlink random access channels.

Hardware Processing Resources

Uplink and downlink bursts are typically processed by one or more DSPs in a base station (e.g., timeslot processors 317 and host DSP 331 shown in FIG. 3). Referring again to FIG. 5, the processing of uplink bursts may be divided into three segments. The first segment (e.g., 525) may detect the presence of a desired uplink signal. The second segment (e.g., 530) of processing may demodulate the signal, if the signal is detected. The third segment (e.g., 535) may construct the burst to be transmitted in the corresponding downlink timeslot. In some embodiments the invention, the demodulation segment is processed after the transmit segment. In yet other embodiments of the invention, the processing of uplink bursts is divided into different segments or performed in a single segment.

In some cases, processing segments 525, 530, and 535 are performed prior to the start of the downlink timeslot that corresponds to the monitored uplink timeslot (e.g., prior to timeslot 520A). In other cases, one or more of the processing segments continues to a successive frame or frames. In either case, processing segments 525, 530, and 535 may be reserved to process the desired signal. In the illustrated embodiment of the invention, processing segments 525, 530, and 535 have been reserved to process a signal, if the signal is detected during timeslot 515A. A person of ordinary skill in the art will appreciate that processing segments 525, 530, and 535 may begin and end at different points in time, be performed in a different order, or may not be performed if, for example, a desired signal is not detected in slot 515A.

In one embodiment of the invention, the signal detected at 525 is an uplink traffic channel burst from a particular remote terminal. During detect segment 525, one or more processors (e.g., timeslot processors 317 and host DSP 331 shown in FIG. 3) monitor an RF resource for a particular signal such as a ramp-up signal, training sequence signal, information signal or similar uplink signal from a remote terminal, in an embodiment of the invention. A person of ordinary skill in the art will recognize that the signal may be any signal that informs the one or more processors that a valid uplink burst from a scheduled user is occurring in the appropriate timeslot.

The base station may not detect the signal during segment 525, because no signal is transmitted in uplink timeslot 515A, or because a signal other than the desired signal is transmitted in uplink timeslot 515A, or because the desired signal is obscured by noise and interference. According to an embodiment of the invention, one or more processors (e.g., timeslot processors 317 and host DSP 331 shown in FIG. 3) determine that the desired signal is not present at 525. Instead of allowing processing resources that have been reserved for the scheduled user to be idle during demodulation segment 530 and transmit segment 535, the processing resources are reallocated to process data from (or for) another remote terminal, according to an embodiment of the invention. In an embodiment of the invention, the one or more processors construct a page burst for another user during at least a portion of demodulation segment 530 and transmit segment 535. Similarly, the one or more processors may demodulate a random access burst from another user, construct an access assignment burst for another user, or process other data with the reallocated processing resources, in an embodiment of the invention. The page burst is sent to a user other than the scheduled user during the corresponding downlink timeslot 520A, in an embodiment of the invention.

According to an embodiment of the invention, the base station uses a list of paging identifiers (PIDs) to select the target remote terminal of the page burst. A paging identifier is an identifier corresponding to a particular remote terminal that is inserted into a page burst to inform the remote terminal that it is the intended recipient of the page. In some embodiments of the invention, the base station assigns each remote terminal a PID when the remote terminal registers with the base station. The base station maintains a list of active PIDs, in an embodiment of the invention. In an embodiment of the invention, a base station determines for which remote terminals it is buffering information and sequentially pages those remote terminals in the order of their PIDs on the PID list, as resources become available. In alternate embodiments of the invention, other schemes are used to determine which remote terminal to page.

Referring again to FIG. 5, reference numeral 550 illustrates that in some embodiments of the invention, a downlink timeslot is large enough to accommodate two (or more) page bursts (or access assignment bursts). In such embodiments of the invention, a base station may divide a downlink timeslot into two or more subslots (e.g., subslots 555 and 560). The base station employs the one or more processors (e.g., timeslot processors 317 and host DSP 331 shown in FIG. 3) to construct two or more page bursts for two or more users. In the embodiment of the invention illustrated in FIG. 5, the one or more processors transmit a page burst to an unscheduled user in subslot 555 and another page burst to another unscheduled user in subslot 560. Alternatively, page bursts may be transmitted only in subslot 555 or only in subslot 560, in an embodiment of the invention.

Figure 6:
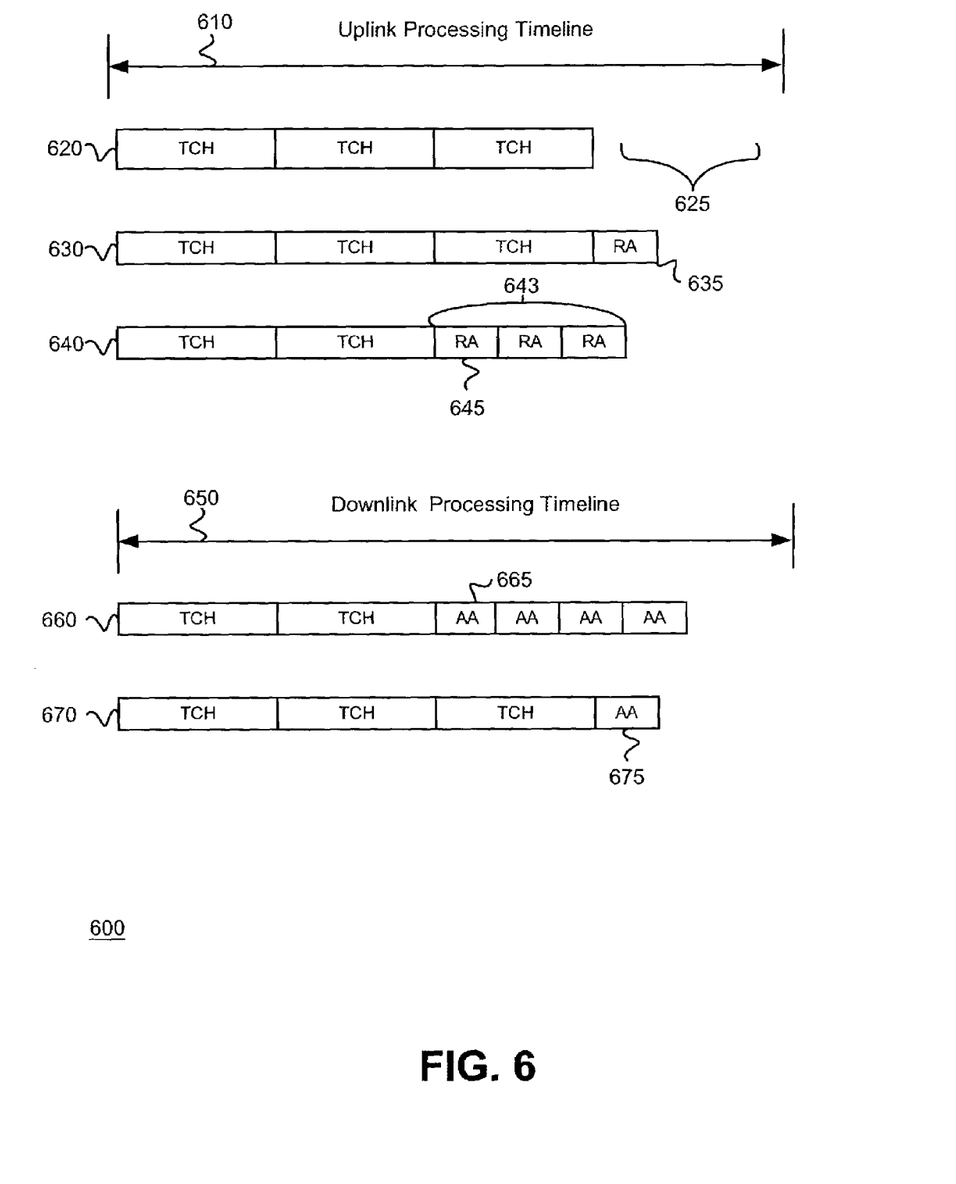
FIG. 6 illustrates the allocation of processing resources during an uplink/downlink timeslot pair according to an embodiment of the invention.

FIG. 6 illustrates the allocation of processing resources during an uplink/downlink timeslot pair according to an embodiment of the invention. Reference numeral 610 shows the uplink processing timeline for processing resources allocated to a particular RF resource (e.g., a frequency-timeslot pair). Example processing timelines 620, 630, and 640 illustrate how the allocated processing resources are used under three different conditions. For example, reference numeral 620 illustrates the processing timeline for a conventional base station wherein processing resources are allocated to process three traffic channel bursts from three remote terminals. As shown by reference numeral 625, conventional base stations do not reallocate unused processing resources when they are available.

Example processing timeline 630 illustrates processing resources being reallocated according to an embodiment of the invention. A base station implemented according to an embodiment of the invention (e.g., base station 300 shown in FIG. 3) detects that some fraction of processing resources are unused during an uplink timeslot (e.g., the fraction shown at 625). Base station 300 reallocates at least some of those resources to process random access burst (RA) 635 transmitted by an unscheduled user.

Example processing timeline 640 illustrates an embodiment of the invention in which base station 300 detects that one of the three scheduled uplink traffic channel bursts is not being transmitted during the appropriate uplink timeslot. As shown at 643, Base station 300 reallocates at least some of the processing resources that would have processed the scheduled traffic channel burst to instead process three random access bursts (RA) from three different users.

Reference numeral 650 shows the downlink processing timeline for processing resources allocated to the particular RF resource (e.g., a frequency-timeslot pair). The processing resources allocated to the downlink timeslot may or may not be commensurate with the processing resources allocated to a corresponding uplink timeslot. Example processing timelines 660 and 670 illustrate how the allocated processing resources are used under two exemplary conditions.

Example processing timeline 660 illustrates a case in which the base station has determined that there are sufficient uplink and downlink processing resources to add an additional traffic channel to the RF resource. The base station may receive a request to establish a traffic channel via an uplink RA burst (e.g., RA burst 645). If the base station determines that the given RF resource can support an additional traffic channel, the base station may assign a traffic channel to the requesting remote terminal via an access assignment (AA) burst, as shown at 665.

Assigning A Different RF Resource in an Access Assignment and Queuing a Remote Terminal for a Subsequent Page In some embodiments of the invention, the base station may determine that a given RF resource cannot support an additional traffic channel. Example processing timeline 670 illustrates a case in which the base station has determined that there are insufficient uplink and downlink processing resources to add an additional traffic channel to the RF resource. The base station may receive a request to establish a traffic channel via an uplink RA burst (e.g., RA burst 635). If the base station determines that the given RF resource cannot support an additional traffic channel, the base station may assign a traffic channel on another RF resource to the requesting remote terminal. For example, the base station may transmit AA 665 to assign a channel on a different RF resource to the requesting remote terminal, in an embodiment of the invention.

Alternatively, in an embodiment of the invention, AA 675 may contain a message informing the requesting remote terminal that the base station will transmit a page burst for the remote terminal at a later time. It may be advantageous for the base station to do so, for example, if there are no available RF resources, or if it is difficult (or impossible) to coordinate the assignment of traffic channels across two or more DSPs (e.g., timeslot processors 317 and host DSP 331 shown in FIG. 3). In an embodiment of the invention, a base station sends an AA-queued message to inform a base station that the base station will page the remote terminal at a later time. In some embodiments of the invention, the base station may assign a channel on a different RF resource to the requesting remote terminal for reasons other than the sufficiency of processing resources. For example, the base station may assign the remote terminal a channel on a different resource because of large pathloss differences with existing TCH channels or too much spatial signature correlation with existing TCH channels, in an embodiment of the invention.

While the above-described embodiment of the invention operates in a TDMA system, the invention is also applicable in a frequency division multiple access (FDMA) system. In an FDMA system, the transmit and receive channels are assigned separate frequencies rather than separate timeslots. Thus, for each uplink frequency, there is an associated downlink frequency. In some embodiments of the invention, a frame consists of a number of uplink/downlink frequency pairs.

An embodiment of the invention may operate in accordance with spatial division multiple access ("SDMA"). With SDMA, more than one remote terminal associated with a base station can communicate with base station on the uplink slot of the same "conventional" channel, that is, the same frequency and time channel (for an FDMA and TDMA system) or code channel (for a CDMA system), so long as the co-channel remote users are spatially separated. In such a case, a smart antenna system provides for more than one "spatial channel" within the same conventional channel, and an adaptive spatial processor performs uplink spatial processing to mitigate interference from remote terminals associated with the station that share the conventional channel with a desired remote terminal.

Descriptions of Flow Charts

Figures 7A, 7B:
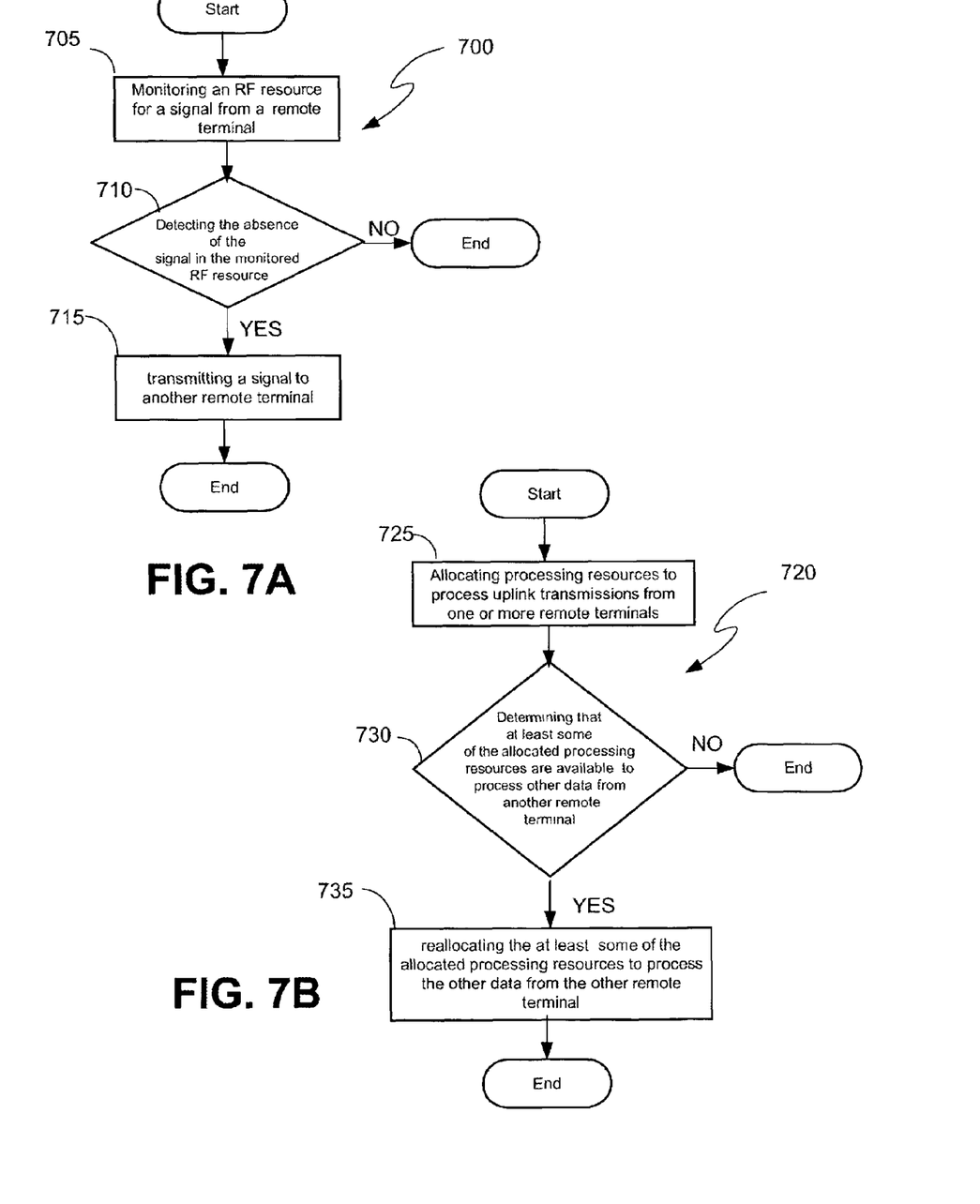
FIGS. 7A and 7B are block diagrams illustrating certain aspects of methods for efficient usage of hardware processing resources.

FIG. 7A is a flow diagram illustrating certain aspects of a method for efficient usage of hardware processing resources. Referring to process block 705, in one embodiment of the invention, a base station monitors an RF resource for a signal from a remote terminal. One or more processors (e.g., timeslot processors 317 and host DSP 331 shown in FIG. 3) detect the absence of the signal in the monitored RF resource at process block 710. According to an embodiment of the invention, if the signal is absent from the RF resource, the processing resources allocated to process the signal are reallocated to process data from another remote terminal as shown in process block 715.

FIG. 7B is a flow diagram illustrating certain aspects of an alternative method for efficient usage of hardware processing resources. Referring to process block 725, in an embodiment of the invention, a base station allocates processing resources to process uplink transmissions from one or more remote terminals. One or more processors (e.g., timeslot processors 317 and host DSP 331 shown in FIG. 3) determine whether at least some of the allocated processing resources are available to process other data from another remote terminal at process block 730. Processing resources are available, for example, if the processing resources are not needed to process data they have been allocated to process. According to an embodiment of the invention, if at least some of the allocated processing resources are available, they may be reallocated to process other data from another remote terminal as shown at 735.

Regarding FIGS. 7A and 7B, the particular methods associated with embodiments of the invention are described in terms of computer software and hardware with reference to a flowchart. The methods to be performed by efficient hardware processing system constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a base station) executing the instructions from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

In the preceding description various aspects of the invention, a method and apparatus for providing efficient usage of hardware processing resources, are described. Specific details are set forth in order to provide a thorough understanding of the invention. It will be apparent, however, to those skilled in the art that the invention may be practiced with only some or all of the described aspects of the invention, and with or without some or all of the specific details. In some instances, well-known architectures, steps, and techniques haven not been shown to avoid unnecessarily obscuring the invention. For example, specific details are not provided as to whether some aspects of the method and apparatus are implemented as software routines, hardware circuits, firmware, or a combination thereof.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
    allocating processing resources to process an RF signal burst from a remote terminal on an uplink transmission carrier, the RF signal burst comprising a traffic channel burst from the remote terminal;
    determining whether a portion of the processing resources are available to process other data; and
    reallocating the portion of processing resources to process the other data when the portion of processing resources are determined to be available, wherein reallocating the portion of processing resources comprises reallocating the portion of processing resources into two or more sub-portions of processing resources including at least a first sub-portion of processing resources to process a random access burst from a second remote terminal and a second sub-portion of processing resources to process the other data.

2. The method of claim 1, wherein determining whether the portion of processing resources are available to process other data comprises determining whether a radio frequency ("RF") signal from the remote terminal is absent in an RF resource.

3. The method of claim 2, wherein determining whether the RF signal from the remote terminal is absent in the RF resource comprises determining whether the traffic channel burst is absent in the RF resource.

4. The method of claim 3, wherein determining whether the RF signal is absent from the RF resource comprises monitoring an uplink timeslot on a time division multiple access (TDMA) channel for the traffic channel burst from the remote terminal.

5. The method of claim 3, wherein determining whether the RF signal is absent from the RF resource comprises monitoring a global system for mobile communications (GSM) channel for the traffic channel burst from the remote terminal.

6. The method of claim 3, wherein determining whether the RF signal is absent from the RF resource comprises monitoring a code division multiple access (CDMA) channel for the traffic channel burst from the remote terminal.

7. The method of claim 3, wherein determining whether the RF signal is absent from the RF resource comprises monitoring a particular uplink frequency band on a frequency division multiple access (FDMA) channel for the traffic channel burst from the remote terminal.

8. The method of claim 1, further comprising:
    allocating the second sub-portion of processing resources to process a stream request message from a third remote terminal.

9. The method of claim 1, further comprising:
    allocating the second sub-portion of processing resources to process a random access burst from a third remote terminal.

10. The method of claim 1, wherein the processing resources allocated to process the RF signal burst from the remote terminal are, at least in part, processing resources allocated to decode the RF signal burst.

11. The method of claim 1, wherein the processing resources allocated to process the RF signal burst from the remote terminal are, at least in part, processing resources allocated to construct a second RF signal burst to be transmitted to the remote terminal on a downlink transmission carrier in response to the RF signal burst from the remote terminal on the uplink transmission carrier.

12. The method of claim 1, wherein the processing resources comprise processing resources from two or more digital signal processors.

13. The method of claim 1, further comprising transmitting a second RF signal burst to a second remote terminal to inform the second remote terminal that a page burst will be subsequently transmitted.

* * * * *